US011955256B2

(12) United States Patent
Sagawa et al.

(10) Patent No.: US 11,955,256 B2
(45) Date of Patent: Apr. 9, 2024

(54) SIGNAL TRANSMISSION CABLE

(71) Applicant: Hitachi Metals, Ltd., Tokyo (JP)

(72) Inventors: Hideyuki Sagawa, Tokyo (JP); Detian Huang, Tokyo (JP); Takahiro Sugiyama, Tokyo (JP); Hideki Nonen, Tokyo (JP); Masashi Arai, Tokyo (JP); Hiroshi Ishikawa, Tokyo (JP); Xinweilong Li, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/859,373

(22) Filed: Jul. 7, 2022

(65) Prior Publication Data

US 2023/0027963 A1 Jan. 26, 2023

(30) Foreign Application Priority Data

Jul. 16, 2021 (JP) ................................. 2021-118231

(51) Int. Cl.
*H01B 11/00* (2006.01)
*H01B 3/30* (2006.01)
*H01B 7/17* (2006.01)
*H01B 11/18* (2006.01)

(52) U.S. Cl.
CPC ........... *H01B 11/1808* (2013.01); *H01B 3/30* (2013.01); *H01B 7/17* (2013.01); *H01B 11/1834* (2013.01)

(58) Field of Classification Search
CPC ............................ H01B 7/188; H01B 11/1058
See application file for complete search history.

(56) References Cited

U.S. PATENT DOCUMENTS

| | | | | |
|---|---|---|---|---|
| 4,751,136 | A * | 6/1988 | Kamiya | H01Q 15/142 428/317.1 |
| 6,953,888 | B2 * | 10/2005 | Livshitz | H01B 11/1895 174/28 |
| 2006/0254792 | A1 * | 11/2006 | Kimura | H01B 13/016 174/28 |
| 2011/0226507 | A1 * | 9/2011 | Ueda | H01B 11/1817 174/106 R |
| 2017/0103828 | A1 * | 4/2017 | Sugita | H01B 7/0216 |
| 2018/0007816 | A1 * | 1/2018 | Yamasaki | H05K 9/0045 |

FOREIGN PATENT DOCUMENTS

JP 2000-285747 A 10/2000

* cited by examiner

*Primary Examiner* — Chau N Nguyen
(74) *Attorney, Agent, or Firm* — MCGINN I.P. LAW GROUP, PLLC.

(57) ABSTRACT

A signal transmission cable is provided with a conductor, an insulator covering around the conductor, a shield layer covering around the insulator, a sheath covering around the shield layer, and a plating base layer is provided between the insulator and the shield layer to cover around the insulator. The shield layer has a plating layer provided to cover the plating base layer to be in contact with an outer peripheral surface of the plating base layer. A surface roughness of an outer peripheral surface of the plating layer is less than a surface roughness of an inner peripheral surface of the plating layer.

6 Claims, 6 Drawing Sheets

SIGNAL TRANSMISSION CABLE

CROSS-REFERENCE TO RELATED APPLICATION

The present patent application claims the priority of Japanese patent application No. 2021-118231 filed on Jul. 16, 2021, and the entire contents thereof are hereby incorporated by reference.

TECHNICAL FIELD

The present invention relates to a signal transmission cable.

BACKGROUND ART

A signal transmission cable is used as a cable designed to carry out high-frequency signal transmission and to be used as internal wiring in an image recording device to be used in an automatic operation or the like, or as internal wiring in an electronic device such as a smartphone or a tablet terminal or the like, or as wiring in a machine tool such as an industrial robot or the like. For this signal transmission cable, for example, a coaxial cable is used.

As the conventional coaxial cable, there is known one with a shield layer being configured in such a manner that a taping member such as a copper tape or the like provided with a copper foil on a resin layer is helically wrapped around a periphery of an insulator (see, e.g., Patent Literature 1).

CITATION LIST

Patent Literature

Patent Literature 1: JP2000-285747A

SUMMARY OF THE INVENTION

However, in the conventional coaxial cable described above, when the coaxial cable is bent, gaps may be formed in overlapping portions of the taping member or wrinkles may be generated in the taping member. In such a case, an insertion loss (S21) or changes in characteristic impedance between a bent portion and other portions (straight portions that are not bent) will increase, and transmission characteristics may decrease.

In light of the foregoing, it is an object of the present invention to provide a signal transmission cable that is less likely to degrade transmission characteristics when being bent.

To solve the aforementioned problems, one aspect of the present invention provides a signal transmission cable, comprising:

a conductor;

an insulator covering around the conductor;

a shield layer covering around the insulator;

a sheath covering around the shield layer; and a plating base layer is provided between the insulator and the shield layer to cover around the insulator, wherein the shield layer comprises a plating layer provided to cover the plating base layer to be in contact with an outer peripheral surface of the plating base layer, and wherein a surface roughness of an outer peripheral surface of the plating layer is less than a surface roughness of an inner peripheral surface of the plating layer.

Effects of the Invention

According to the present invention, it is possible to provide a signal transmission cable that is less likely to degrade transmission characteristics when being bent.

BEST MODE FOR CARRYING OUT THE INVENTION

Embodiment

An embodiment of the present invention will be described below in conjunction with the accompanying drawings.

Figure 1A:
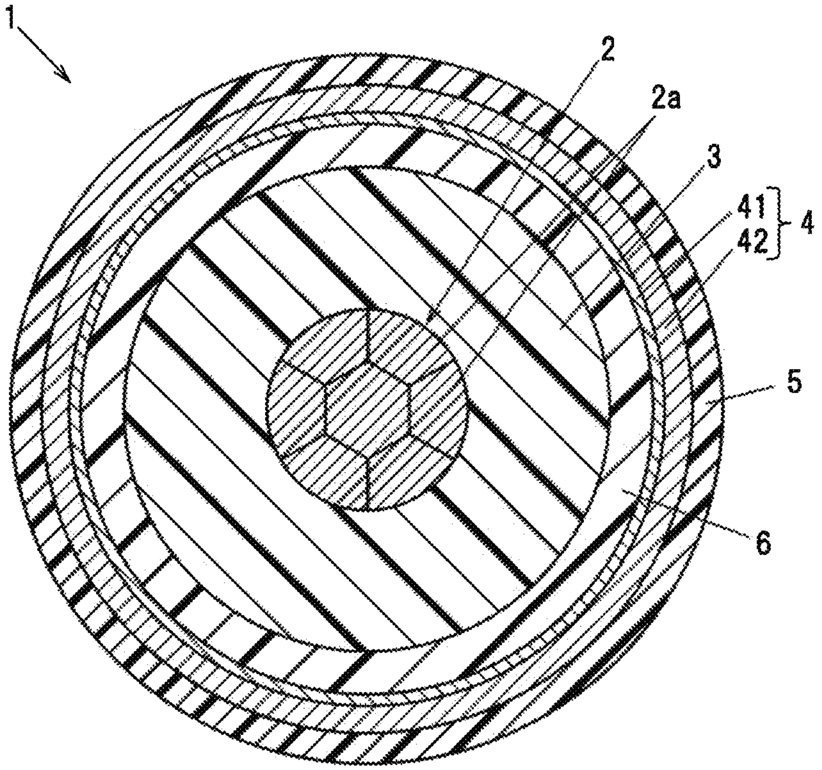
FIG. 1A is a cross-sectional view showing a cross-section perpendicular to a longitudinal direction showing a signal transmission cable according to an embodiment of the present invention.
Figure 1B:
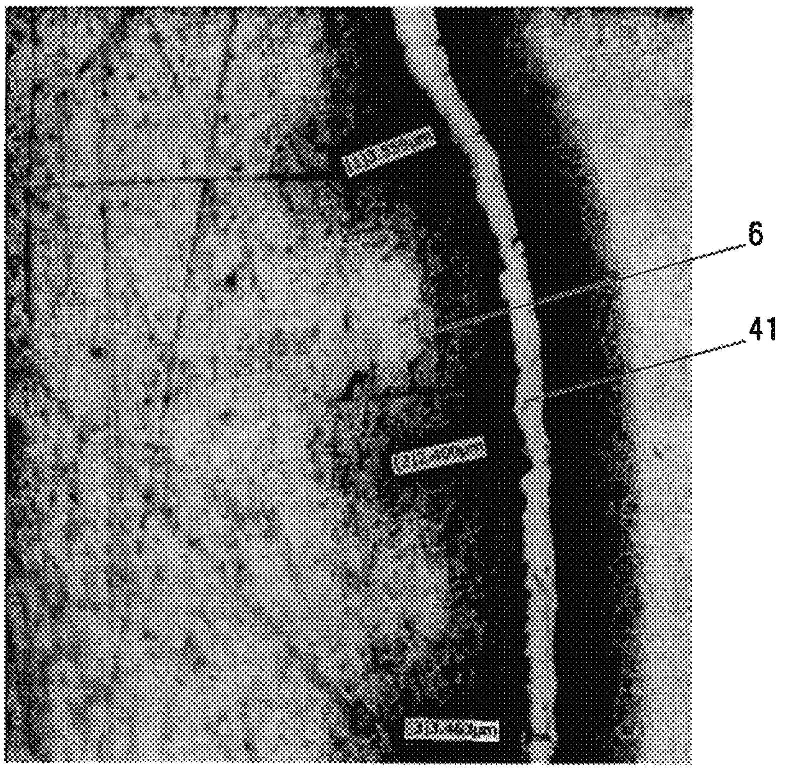
FIG. 1B is an enlarged view of the cross-section of the signal transmission cable shown in FIG. 1A.

FIG. 1A is a cross-sectional view showing a cross-section perpendicular to a longitudinal direction showing a signal transmission cable according to an embodiment of the present invention. FIG. 1B is an enlarged photographic image of the cross-section of the signal transmission cable shown in FIG. 1A.

As shown in FIG. 1A, a signal transmission cable 1 is a coaxial cable that includes a conductor 2 located at a cable center, an insulator 3, which is provided to cover a periphery of the conductor 2, and a shield layer 4, which is provided to cover a periphery of the insulator 3, and a sheath 5, which is provided to cover a periphery of the shield layer 4. In other words, the signal transmission cable 1 is a coaxial cable with the conductor 2 as an inner conductor and the shield layer 4 as an outer conductor.

The signal transmission cable 1 is designed to be used, for example, as a fixed part cable to connect a robot and a control device in a factory or the like, and has a length of, e.g., on the order of 25 m to 100 m. Further, when the signal transmission cable 1 is wired in an electronic device, its length may be e.g., on the order of 25 m to 100 m. Note that the term "cover" includes a case where the layers are arranged with the other layer therebetween. For example, the other layer may be arranged between the conductor 2 and the insulator 3, between the shield layer 4 and the sheath 5.

(Conductor 2)

In the signal transmission cable 1 according to the present embodiment, the conductor 2 is made of a compressed stranded wire conductor composed of a plurality of strands (i.e., elementary wires) 2*a* stranded together, and subjected to compression in such a manner that a cross-sectional shape perpendicular to the longitudinal direction of the signal transmission cable 1 becomes a predetermined shape. In the present embodiment, the conductor 2 having a circular cross-section as shown in FIG. 1A is formed by compressing the stranded wire conductor formed by concentrically stranding seven strands 2*a* together through a die having a circular outlet having a smaller diameter than that of the stranded wire conductor. One of the seven strands 2*a* to be arranged at the center of the cable 1 has a substantially hexagonal shape in a cross-sectional view, and each of the other six strands 2*a* to be arranged on the periphery thereof has a substantially fan shape in the cross-sectional view. Further, adjacent strands 2*a* of the plurality of strands 2*a* may be in contact (surface contact) with each other in such a manner that no space (i.e., gap, clearance) forms therebetween. Furthermore, the outer surface of the compressed stranded wire conductor may be the smooth surface in the circumferential direction of the signal transmission cable 1 and the longitudinal direction of the signal transmission cable 1. Note that, although, in the signal transmission cable 1 according to the present embodiment shown in FIG. 1A, there is shown the example where the conductor 2 is composed of the compressed stranded wire conductor having a circular cross-sectional shape, the conductor 2 may be composed of the compressed stranded wire conductor subjected to compression into a cross-sectional shape (e.g., a polygonal shape such as a square shape or the like) other than a circular shape. Since the conductor 2 is composed of the compressed stranded wire conductor having a circular cross-sectional shape, the signal transmission cable 1 can easily be bent in any direction, and therefore, is easily bent and routed.

Although a normal stranded wire conductor being subjected to no compression is more flexible and easier to bend than a single wire conductor, there are many spaces between its constituent wires, and therefore its wires are in point contact. For that reason, in general, the normal stranded wire conductor has a higher conductor resistance and a lower electrical conductivity than those of a single wire conductor having the same outer diameter. By using the compressed stranded wire conductor as the conductor 2 as in the present embodiment, the strands 2*a* are adhered tightly to each other, with no space between adjacent strands 2*a* of the plurality of strands 2*a*. For that reason, the conductor 2 using its constituent compressed stranded wire conductor can be lowered in conductor resistance as compared to the normal stranded wire conductor having the same outer diameter. As a result, the conductor 2 using its constituent compressed stranded wire conductor achieves enhanced electrical conductivity and good attenuation properties. Further, an electric current for transmitting a high-frequency signal (hereinafter, referred to simply as "current") passes mainly through the outer periphery portion of the conductor 2 by a skin effect. In the case where the conductor 2 is composed of a stranded conductor formed by stranding the plurality of strands 2*a* together, a bending radius of the wire is smaller than the single solid conductor having the same outer diameter as the stranded conductor so that a cross-sectional area through which the current passes would be smaller than that of the single solid conductor having the same outer diameter as the stranded conductor. Meanwhile, in the present embodiment, the use of the compressed stranded wire conductor formed by compressing the stranded wire conductor as the conductor 2 results in a tight adhesion between the strands 2*a*, 2*a*, thus making the outer periphery of the conductor 2 a concentrical circular shape similar to that of the single solid conductor. As a result, in the conductor 2 composed of the compressed stranded wire conductor, the cross-sectional area through which the current passes can be enlarged so that the good attenuation property of the conductor 2 can be obtained.

To achieve the good attenuation properties, the electrical conductivity of the compressed stranded wire conductor used as the conductor 2 is desirably 99% IACS or more. In the present embodiment, a silver-plated soft copper wire made of pure copper is being used as the strand 2*a* of the conductor 2 to achieve high electrical conductivity. It should be noted, however, that unplated soft copper wire (without silver plating) made of pure copper may be used as the strands 2*a*. In addition, when the strands 2*a* are compressed through the die, the strands 2*a* are subjected to the occurrence of a compressive strain, leading to a lowering in the electrical conductivity. However, by thereafter performing heat treatment (annealing treatment), it is possible to remove the strain and achieve an electrical conductivity of 99% IACS or higher.

(Insulator 3)

As the insulator 3, it is desirable to use an insulating material having as low a permittivity as possible to enhance the high-frequency signal transmission properties (more specifically, for example, to resist the occurrence of high-frequency signal attenuation in a band of 10 MHz to 50 GHz during long-distance transmission). In the present embodiment, a fluoropolymer is being used as the insulator 3. As the fluoropolymer to be used as the insulator 3, e.g., FEP (Tetrafluoroethylene-Hexafluoropropylene copolymer), PFA (Tetrafluoroethylene-Perfluoroalkylvinylether copolymer), or the like may be used. The insulator 3 preferably has a thickness of 0.2 mm or more and 2.0 mm or less.

(Sheath 5)

Around the insulator 3, a plating base layer (i.e., sub-plating layer, plating foundation layer) 6, the shield layer 4, and the sheath 5 will be provided sequentially. Details of the plating base layer 6 and the shield layer 4 will be described below.

The sheath 5 is composed of an insulative resin composition such as fluoropolymers (i.e., fluorine resins), polyvinyl chloride (PVC), urethane, or polyolefin. In the present invention, the sheath 5 is made of PFA as one of the fluoropolymers. FEP may be used as fluoropolymer for the sheath 5.

Although the sheath 5 is formed by the extrusion molding, if the solid molding is performed, the resin constituting the sheath 5 will enter the spaces between metal wires of the outer shield layer 42, and the signal transmission cable 1 may become hard and difficult to bend. To avoid this, in the present embodiment, the sheath 5 is being molded by tube extrusion. This allows the resin constituting the sheath 5 to be suppressed from entering the spaces between the metal wires of the outer shield layer 42, and the sheath 5 and the outer shield layer 42 to be moved separately from each other. That is, in the present embodiment, the sheath 5 and the outer shield layer 42 do not adhere to each other so the outer shield layer 42 can relatively freely be moved within the sheath 5. This makes the signal transmission cable 1 easier to bend.

(Plating Base Layer 6)

In the signal transmission cable 1 according to the present embodiment, the plating base layer 6 is provided between the insulator 3 and the shield layer 4 to cover the insulator 3. The plating base layer 6 is a base layer for forming a plating layer 41 to be described below, and in particular, for making an inner surface of the plating layer 41 to have a predetermined surface roughness. In the present invention, the fluoropolymer is used as the insulator 3, and it is difficult to form the plating layer 41 directly on the fluoropolymer. Therefore, the plating base layer 6, which is the base layer of the plating layer 41, is provided to cover the insulator 3, which is composed of the fluoropolymer. The plating base layer 6 is preferably composed of an insulative resin on an outer surface of which the plating layer 41 can be formed. In the present embodiment, the plating base layer 6 composed of PE (polyethylene) is used, but the plating base layer 6 composed of PP (polypropylene) may be also used. The plating base layer 6 is preferably formed to be thin to reduce the effect on transmission characteristics, and the thickness of the plating base layer 6 is preferably thinner than that of the insulator 3. More specifically, the thickness of the plating base layer 6 is 0.5 times the thickness of the insulator 3, e.g., 0.10 mm or more and 0.20 mm or less. When the thickness of the plating base layer 6 is 0.1 mm or more, the mechanical strength of the plating base layer 6 is increased, which makes it easier to suppress the fracture of the plating base layer 6 due to bending. Also, when the thickness of the plating base layer 6 is 0.20 mm or less, the stress on the plating layer 41 (i.e., the stress applied to the plating layer 41 when the plating base layer 6 follows the bend of the signal transmission cable 1) is reduced when the signal transmission cable 1 is bent or the like, which makes it easier to suppress cracking in plating layer 41.

Because the gaps between the plating base layer 6 and the insulator 3 may adversely affect the transmission characteristics, it is desirable to have the plating base layer 6 in contact with the outer surface of the insulator 3 without any gaps. Note that it is possible to observe, by using e.g., an optical microscope or an electron microscope, that the plating base layer 6 is in contact with the outer surface of the insulator 3 with no gap therebetween.

Further, it is preferable that, when the signal transmission cable 1 is bent, the plating base layer 6 can be moved in the longitudinal direction of the signal transmission cable 1 relative to the bending of the insulator 3 (be able to be slid in the longitudinal direction of the cable 1 relative to the insulator 3). Therefore, when the signal transmission cable 1 is bent, the plating base layer 6 acts to suppress the occurrence of cracking in the plating layer 41 resulting from the bending of the insulator 3 following the bending of the signal transmission cable 1, by bending while moving in the longitudinal direction of the cable 1 relative to the bending of the insulator 3. Note that the "cracking" referred to herein refers to cracking in the plating layer 41 that occurs in a range from the outer surface of the plating layer 41 to the inner surface of the plating layer 41 (the surface in contact with the insulator 3).

When the cracks occur in the plating layer 41, a phenomenon called "co-cracking" may occur. However, in the present embodiment, the plating layer 41 is formed via the plating base layer 6, which is a separate component from the insulator 3. Therefore, even if the cracks occur in the plating layer 41, there is no risk that the insulator 3 will crack, and it is possible to suppress malfunctions such as poor insulation.

Further, it is preferable that the plating base layer 6 is not being joined to the insulator 3 and is provided to be separable (i.e., peelable) from the insulator 3. This allows for easy separation of the plating layer 41 from the insulator 3 to expose the insulator 3 during the terminal processing of the signal transmission cable 1, thereby improving the workability of the terminal processing.

The outer surface of the plating base layer 6 is processed with a predetermined treatment to form the plating layer 41. Further details of this treatment will be described below.

(Shield Layer 4)

The shield layer 4 has a plating layer (inner shield layer) 41 formed to cover the plating base layer 6 and an outer shield layer 42 provided to cover the plating layer 41. The outer shield layer 42 may be omitted.

The outer shield layer 42 is composed of metal wires and constituted by braiding or side-by-side wrapping with the metal wires. In the present embodiment, the outer shield layer 42 is configured as a braided shield composed of braided metal wires. As a material for the metal wires, a soft copper wire or a hard copper wire made of e.g., copper or a copper alloy may be used. Further, the metal wires may be made of aluminum or an aluminum alloy. The metal wires may be subjected to plating on their outer surfaces. In the present embodiment, the outer shield layer 42 is configured as a single layer, but the outer shield layer 42 may be composed of multiple layers. Also, the metal wires constituting the outer shield layer 42 may have lubricity on their surfaces. For example, lubricity may be provided by applying a lubricant such as a talc powder to the surface of the metal wire.

By providing the outer shield layer 42, it is possible to suppress the shield layer 4 from electrically insulating, even if the plating layer 41 is broken by some unexpected damage. In addition, the outer shield layer 42 can further reduce the loss of low-frequency signals with the thickness of the outer shield layer 42, even if the plating layer 41 is thin.

The plating layer 41 together with the outer shield layer 42 constitutes the outer conductor, which is formed to be in direct contact with the outer surface of the plating base layer 6. As described above, the outer shield layer 42 is composed of braided or side-by-side wrapping of the metal wires. However, with the outer shield layer 42 only, the signal transmitted therethrough is emitted from the gap between the metal wires to the outside, so that the amount of attenuation may increase. By providing the plating layer 41, the gaps between the metal wires of the outer shield layer 42 are filled, thereby reducing the amount of attenuation. Note that the plating layer 41 is in contact with the outer shield layer 42 and is connected electrically to the outer shield layer 42.

For the plating layer 41, it is preferable to use a metal with electrical conductivity of 99% or more (99% IACS or higher), e.g., metals comprising copper or silver.

The thickness of the plating layer 41 is preferably 2 μm or more and 5 μm or less. When the thickness of the plating layer 41 is 2 μm or more, the plating layer 41 is less likely to crack even if the outer shield layer 42 and the plating layer 41 come into contact when bending is applied or the like. Also, when the thickness of the plating layer 41 is 5 μm or less, it is possible to suppress the difficulty of bending the signal transmission cable 1 because of the stiffening of the plating layer 41.

As shown in FIG. 1B, in the signal transmission cable 1 according to the present embodiment, the surface roughness of the outer peripheral surface of the plating layer 41 is less than the surface roughness of the inner peripheral surface of the plating layer 41. The outer peripheral surface of the plating layer 41 is the surface located radially outwardly in the plating layer 41, which is in contact with the outer shield layer 42. The inner peripheral surface of the plating layer 41 is the surface located radially inwardly in the plating layer 41, which is in contact with the plating base layer 6. As shown in FIG. 1B, the surface roughness of the inner peripheral surface of the plating layer 41 is equivalent to the surface roughness of the outer peripheral surface of the plating base layer 6, as the plating layer 41 is in close contact with the plating base layer 6 without gaps. FIG. 1B is a photographic image showing an enlarged cross-section of the signal transmission cable 1, which was prepared as a sample.

By increasing the surface roughness of the inner peripheral surface of the plating layer 41, the anchor effect makes it difficult for the plating layer 41 to detach from the plating base layer 6. In the present embodiment, the surface roughness of the inner peripheral surface of the plating layer 41 (i.e., the surface roughness of the outer peripheral surface of the plating base layer 6) is increased by intentionally coarsening the plating base layer 6. The arithmetic mean roughness Ra of the inner peripheral surface of the plating layer 41 is preferably 2 μm or more to suppress the separation of the plating layer 41 from the plating base layer 6.

By reducing the surface roughness of the outer peripheral surface of the plating layer 41, it is also possible to suppress the abrasion on the plating layer 41 and the outer shield layer 42 when the outer shield layer 42 is scraped against the plating layer 41, such as when the signal transmission cable 1 is bent. It suppresses damage (cracking) caused by the abrasion (i.e., wear) on the plating layer 41. The arithmetic mean roughness Ra of the outer peripheral surface of the plating layer 41 is preferably smaller than the arithmetic mean roughness Ra of the inner peripheral surface of the plating layer 41, and it is preferably less than 2 μm.

Thus, by reducing the surface roughness of the outer peripheral surface of the plating layer 41 to be less than the surface roughness of the inner peripheral surface of the plating layer 41, it is possible to suppress the abrasion with the outer shield layer 42 from causing cracking of the plating layer 41. Even if the plating layer 41 is cracked, the plating layer 41 will be less likely to detach from the plating base layer 6. Therefore, the transmission characteristics are less likely to degrade when the signal transmission cable 1 is bent.

Furthermore, in the present embodiment, the plating layer 41 is formed on the plating base layer 6, which is composed of a resin. Even if the signal transmission cable 1 is bent accordingly according to the routing layout, the plating base layer 6 can be slid against the insulator 3 while remaining in contact with the outer surface of the insulator 3 without any gaps. Thus, the distance between the conductor 2 and the plating layer 41 (i.e., the distance between the inner and outer conductors) can be kept substantially constant. For example, if a metal tape composed of a metal layer formed on one side of a resin layer is longitudinally lapped instead of the plating layer 41 and the plating base layer 6, the bending causes wrinkles or folds in the metal tape, thereby generating a gap between the insulator and the metal tape, and so on. The characteristic impedance may change locally, resulting in greater return loss due to characteristic impedance mismatch. In contrast, in the signal transmission cable 1 according to the present embodiment, it is possible to keep the distance between the conductor 2 and the plating layer 41 substantially constant since the plating base layer 6 flexibly deforms in response to the bending, and to keep the characteristic impedance constant in the cable longitudinal direction of the signal transmission cable 1. It is thus possible to achieve good attenuation characteristics by suppressing the return loss.

(Method of Forming the Plating Layer 41)

Figure 2:
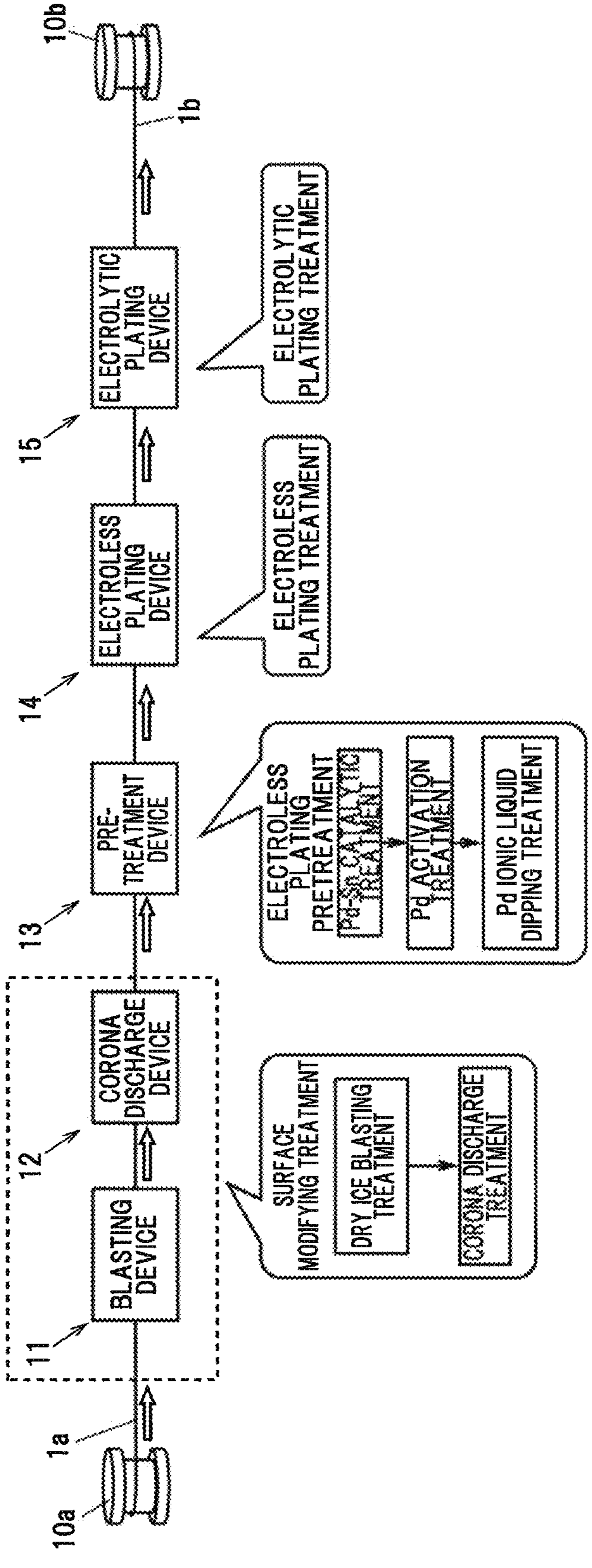
FIG. 2 is an explanatory diagram showing a formation of a plating layer.

FIG. 2 is an explanatory diagram for explaining the formation of the plating layer 41. When forming the plating layer 41, first, a first cable substrate 1*a* is sent out from a sending drum 10*a* and the surface modifying treatment is performed. The first cable substrate 1*a* is composed of an insulator 3 and a plating base layer 6 that are sequentially formed around a conductor 2.

In the surface modifying treatment, a blasting treatment is performed to spray a powdery material on the outer peripheral surface of the plating base layer 6 by a blasting device 11 to coarse the outer peripheral surface of the plating base layer 6 to a predetermined surface roughness. Thereafter, corona discharge treatment is carried out by a corona discharge device 12, thereby modifying the surface of the plating base layer 6 (to be hydrophilic).

Figure 3A:
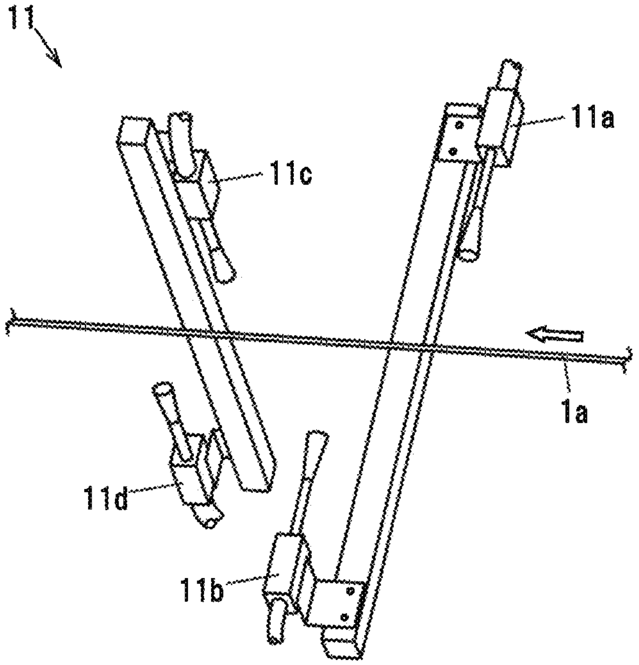
FIG. 3A is a perspective view of a blasting device.
Figure 3B:
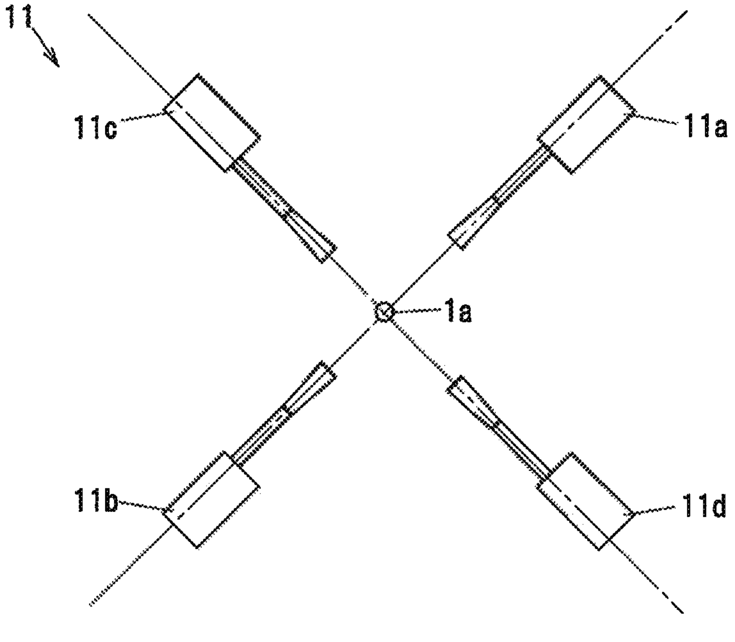
FIG. 3B is a plan view of the blasting device from an upstream side of a conveying direction.

As shown in FIGS. 3A and 3B, the blasting device 11 has multiple (four in the present embodiment) nozzles 11*a* to 11*d* and is configured to spray the powdery material from different directions around the first cable substrate 1*a* with the use of the multiple nozzles 11*a* to 11*d* in such a manner that the outer peripheral surface of the plating base layer 6 is provided with uniform surface roughness. Here, the four nozzles 11*a* to 11*d* are configured to blow the powdery material to the first cable substrate 1*a* from four different directions divided by 90° in the circumferential direction. However, as long as the surface roughness described below is achieved throughout the entire circumference of the first cable substrate 1*a* and the blasting treatment can be performed in such a manner that there is no gap between the insulator 3 and the plating base layer 6, the number and location of the multiple nozzles 11*a* to 11*d* are not limited thereto. For example, when N nozzles are to be placed in the circumferential direction of the first cable substrate 1*a*, the N nozzles should be arranged to be shifted at a uniform angle (360°/N) respectively along the circumferential direction. Also, the amount of powdery material that is blown out from each of the nozzles and the air pressure when blown out may be changed according to the shape of the first cable substrate 1*a*. For example, when the shape of the first cable substrate 1*a* is circular, it is preferable to have the same amount of powdery material and the air pressure sprayed from each of the nozzles. As a result, the first cable substrate 1*a* is roughened to have a predetermined surface roughness of Ra (e.g., the surface roughness Ra is 2.0 μm or more) with no gap between the insulator 3 and the plating base layer 6. The surface of the plating base layer 6 is of the predetermined surface roughness Ra, which allows the inner peripheral surface of the plating layer 41 formed after the pretreatment described below to have a surface roughness equal to the surface roughness of the plating base layer 6.

Here, dry ice is used as the powdery material for the blasting device 11. However, the powder is not limited thereto, e.g., powders composed of metal particles, carbon particles, oxide particles, carbide particles, nitride particles, or the like can also be used.

Returning to FIG. 2, after the surface modifying treatment is performed, electroless plating pretreatment is performed. Here, the electroless plating pretreatment is the pretreatment for the film formation by electroless plating to be performed by the pretreatment device 13, in which Pd—Sn catalytic treatment to adsorb palladium-tin (Pd—Sn) colloids on the outer peripheral surface of the plating base layer 6, a Pd activation treatment to remove Sn from the adsorbed Pd—Sn colloids, and a PD ionic liquid dipping (immersion) treatment to enhance the amount of PD adsorption are successively performed. In the present embodiment, Pd is adsorbed to the outer peripheral surface of the plating base layer 6 in the electroless plating pretreatment, but the metal to be adsorbed is not limited to Pd, and e.g., Pt or Au may be adsorbed.

Thereafter, an electroless plating device 14 performs electroless plating. In electroless plating, a copper film is formed from Pd adsorbed by the pretreatment as a seed. Then, electrolytic plating is then performed by an electrolytic plating device 15. The electrolytic plating involves thickening the copper film formed by the electroless plating. As a result, the plating layer 41 is formed. The second cable substrate 1*b* formed with the plating layer 41 is wrapped around a take-up drum 10*b*. Then, the signal transmission cable 1 is manufactured by providing an outer shield layer 42 and a sheath 5 around the plating layer 41 successively.

Figure 4:
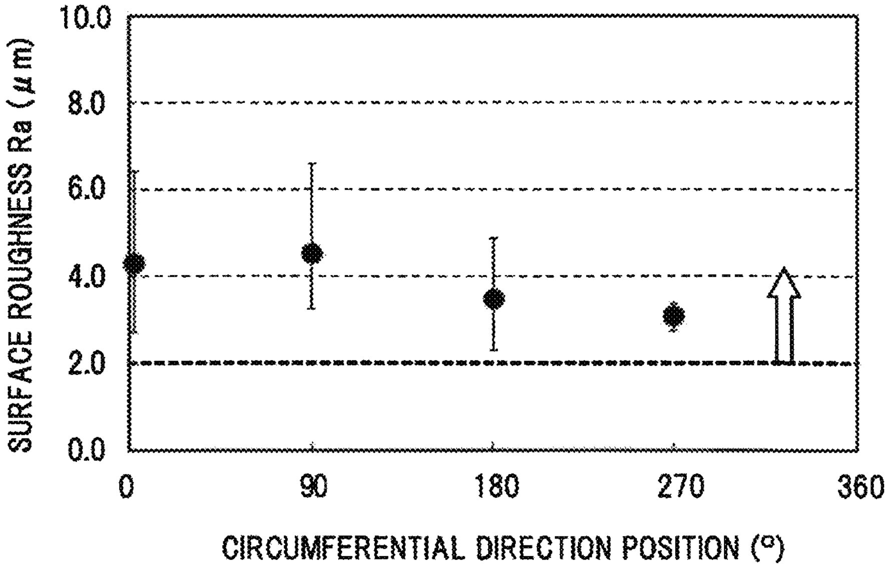
FIG. 4 is a graph chart showing measurement results of surface roughness of an outer peripheral surface of a base plating layer after blasting treatment.

FIG. 4 shows measurement results of the surface roughness of the outer peripheral surface of the plating base layer 6 after the blasting treatment. The surface roughness was measured using a laser microscope (VK8510, made by Keyence), and the measured area was 200 μm×100 μm, and the arithmetic mean roughness Ra was measured at five locations at 10 mm intervals along the cable longitudinal direction, to determine the mean value of the measurements at the five locations. In FIG. 4, the mean value is shown in ● and the variation in the measurements at the five locations is indicated by an I-shaped bar. As shown in FIG. 4, the arithmetic mean roughness Ra of the outer peripheral surface of the plating base layer 6 is 2 μm or more at any position in the circumferential direction, and the mean value is 3 μm or more. The surface roughness of the outer peripheral surface of the plating base layer 6 is equal to the surface roughness of the inner peripheral surface of the plating layer 41, as the plating layer 41 is formed on the outer peripheral surface of the plating base layer 6.

Depending on the conditions during the blasting treatment, the blasting treatment may cause a gap between the insulator 3 and the plating base layer 6. For this reason, the blasting treatment may be performed under conditions where there is no gap between the insulator 3 and the plating base layer 6. The inventors examined and observed that when the line speed (transfer speed) of the first cable substrate 1*a* was set to 2 m/min, there was no gap between the insulator 3 and the plating base layer 6 with the air pressure of the blasting treatment being set to 0.5 MPa, while there was a gap between the insulator 3 and the plating base layer 6 with the air pressure being set to 0.6 MPa. Therefore, in this case, the air pressure of the blasting treatment is preferably less than 6 MPa, more preferably 0.5 MPa or less.

(Transmission Characteristics of the Signal Transmission Cable 1)

A sample of a signal transmission cable 1 in FIG. 1 with no outer shield layer 42 and no sheath 5 was prepared, and the transmission characteristics were measured. First, the transmission loss (insertion loss) S21 was measured. The measurement of S21 was conducted for the straight state without bending the signal transmission cable 1 (no bending) and for the case where the signal transmission cable 1 was bent with a bending radius of R=1 mm. The measurement results are shown in FIGS. 5A and 5B respectively.

Figure 5A:
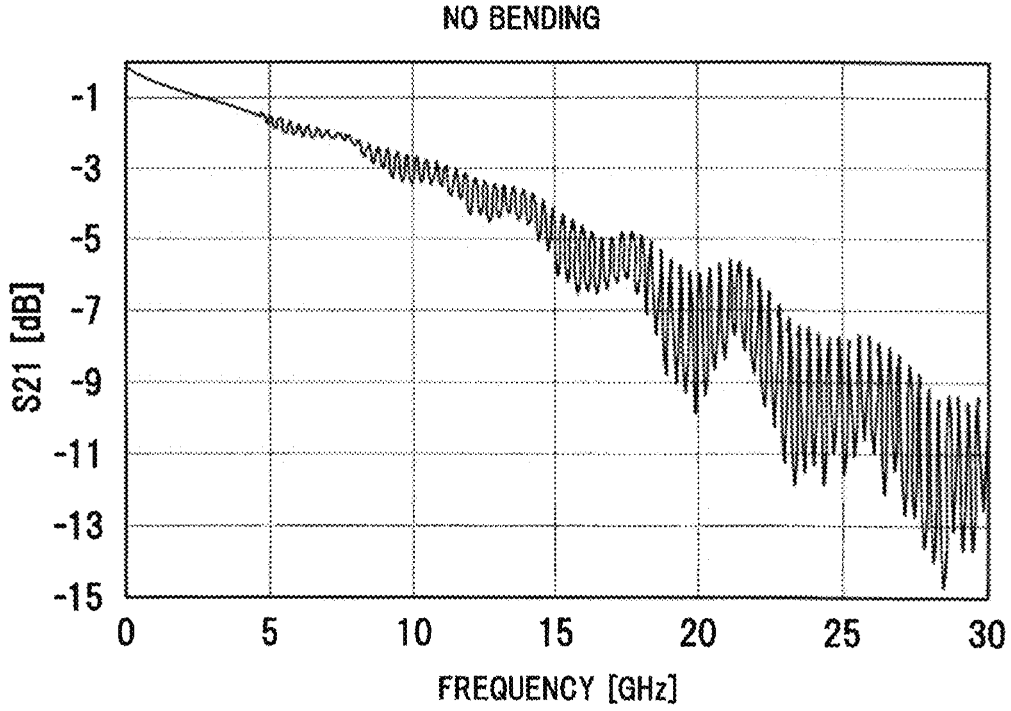
FIG. 5A is a graph chart showing measurement results of an insertion loss S21 in a state where the signal transmission cable is kept straight without being bent.
Figure 5B:
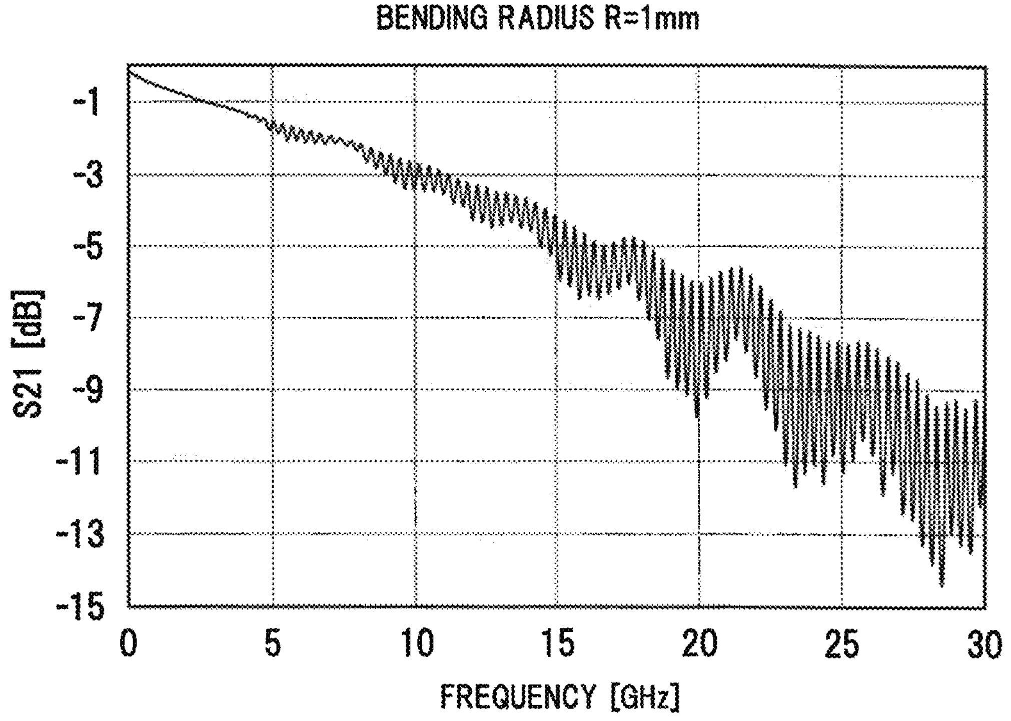
FIG. 5B is a graph chart showing measurement results of the insertion loss S21 in a state where the signal transmission cable is bent with a bending radius of 1 mm.

As shown in FIGS. 5A and 5B, it is confirmed that S21 when the sample was fabricated and bent with a bending radius of R=1 mm is almost equivalent to the straight state. More specifically, the change in S21 with bending radius R=1 mm as compared to S21 in the straight state was 0.4 dB or less at 28 GHz, which can be considered to be small. Although not shown in the drawings, S21 was measured by changing the bending radius R from 40 mm to 1 mm, respectively, but the changes in S21 with other bending radiuses than R=1 mm (change as compared to S21 in the straight state) were small and almost unchanged from the change in S21 when being bent with the bending radius R=1 mm.

Figure 6A:
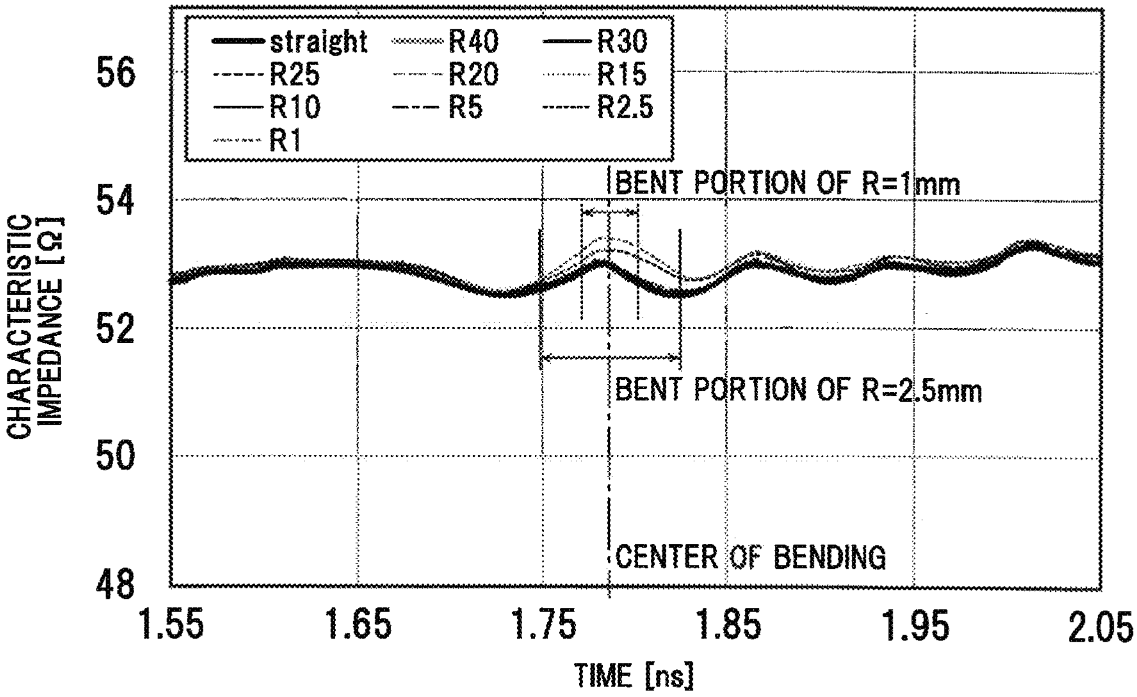
FIG. 6A is a graph chart showing measurement results of changes in a characteristic impedance due to bending.

The change in characteristic impedance was then measured for the straight state and for each case where the bending radius R was changed from 40 mm to 1 mm. The results are summarized in FIG. 6A. As shown in FIG. 6A, it is confirmed that when the bending radius R is 2.5 mm or less, the characteristic impedance has changed slightly at the bent portion.

Figure 6B:
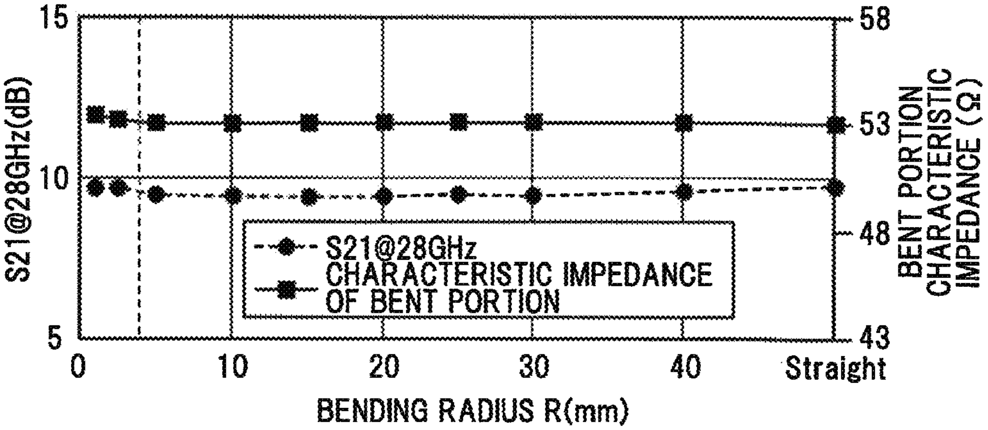
FIG. 6B is a graph chart showing the insertion loss S21 relative to the bending radius and a characteristic impedance of a bent portion.

The transmission loss (insertion loss) S21 at 28 GHz (S21@28 GHz) and the characteristic impedance at the bent portion are summarized in FIG. 6B. As shown in FIG. 6B, it is confirmed that when the bending radius R is reduced to be 2.5 mm or less, there is a slight change in S21 and characteristic impedance but the change is also small. Also, it is confirmed that when the bending radius R is 5 mm or more, S21 and characteristic impedance are almost unchanged from the straight state. As described above, it is confirmed that the signal transmission cable 1 in which transmission characteristics are not reduced when being bent was achieved.

Functions and Effects of the Present Embodiment

As explained above, the signal transmission cable 1 in the present embodiment has the plating base layer 6 between the insulator 3 and the shield layer 4, which is provided to cover the periphery of the insulator 3. The shield layer 4 has the plating layer 41 formed to cover the plating base layer 6 to be in contact with the outer peripheral surface of the plating base layer 6. The surface roughness of the outer peripheral surface of the plating layer 41 is less than the surface roughness of the inner peripheral surface of the plating layer 41.

This configuration prevents wrinkles from occurring on the shield layer when being bent, as in the case of the tape member being used for the shield layer as in the conventional art, and makes it less likely to reduce the transmission characteristics when being bent. In addition, even with the outer shield layer 42, it is possible to suppress the cracks in the plating layer 41 due to the abrasion with the outer shield layer 42. Further, even if the cracks occur in the plating layer 41, the plating layer 41 will be less likely to detach from the plating base layer 6. As a result, the signal transmission cable 1 in which the transmission characteristics are not reduced when being bent can be achieved.

SUMMARY OF THE EMBODIMENTS

Next, the technical ideas grasped from the embodiment will be described with the aid of the reference characters and the like in the embodiments. It should be noted, however, that each of the reference characters and the like in the following descriptions is not to be construed as limiting the constituent elements in the appended claims to the members and the like specifically shown in the embodiments.

According to the feature [1], a signal transmission cable 1 includes a conductor 2, an insulator 3 covering around the conductor 2, a shield layer 4 covering around the insulator 3, a sheath 5 covering around the shield layer 4, and a plating base layer 6 provided between the insulator 3 and the shield layer 4 to cover around the insulator 3, wherein the shield layer 4 includes a plating layer 41 provided to cover the plating base layer 6 to be in contact with an outer peripheral surface of the plating base layer 6, and wherein a surface roughness of an outer peripheral surface of the plating layer 41 is less than a surface roughness of an inner peripheral surface of the plating layer 41.

According to the feature [2], in the signal transmission cable 1, as described in the above feature [1], a thickness of the plating base layer 6 is less than a thickness of the insulator 3.

According to the feature [3], in the signal transmission cable 1 as described in the above feature [1] or [2], an arithmetic mean roughness Ra of the inner peripheral surface of the plating layer 41 is 2 μm or more.

According to the feature [4], in the signal transmission cable 1, as described in any one of the above features [1] to [3], the insulator 3 comprises a fluoropolymer and the plating base layer 6 comprises polyethylene or polypropylene.

Although the embodiments of the present invention have been described above, the aforementioned embodiment is not to be construed as limiting the inventions according to the appended claims. Further, it should be noted that not all the combinations of the features described in the embodiments are indispensable to the means for solving the problem of the invention. Further, the present invention can be appropriately modified and implemented without departing from the spirit thereof.

The invention claimed is:

1. A signal transmission cable, comprising:

a conductor;

an insulator covering around the conductor;

a shield layer covering around the insulator;

a sheath covering around the shield layer; and a plating base layer is provided between the insulator and the shield layer to cover around the insulator, wherein the shield layer comprises a plating layer provided to cover the plating base layer to be in contact with an outer peripheral surface of the plating base layer, wherein a surface roughness of an outer peripheral surface of the plating layer is less than a surface roughness of an inner peripheral surface of the plating layer, the outer peripheral surface of the plating base layer is roughened to have a surface roughness of 2 μm or more, and the arithmetic mean roughness Ra of the inner peripheral surface of the plating layer is 2 μm or more and the arithmetic mean roughness Ra of the outer peripheral surface of the plating layer is less than 2 μm, and wherein a thickness of the plating layer is 2 μm or more and 5 μm or less.

2. The signal transmission cable according to claim 1, wherein a thickness of the plating base layer is less than a thickness of the insulator.

3. The signal transmission cable according to claim 1, wherein the plating layer is formed on the plating base layer, which is composed of a resin.

4. The signal transmission cable according to claim 1, wherein a distance between the conductor and the plating layer is kept substantially constant.

5. The signal transmission cable according to claim 1, wherein the plating base layer flexibly deforms in response to bending.

6. A signal transmission cable, comprising:

a conductor;

an insulator covering around the conductor, a shield layer covering around the insulator;

a sheath covering around the shield layer, and a plating base layer is provided between the insulator and the shield layer to cover around the insulator, wherein the shield layer comprises a plating layer provided to cover the plating base layer to be in contact with an outer peripheral surface of the plating base layer, wherein a surface roughness of an outer peripheral surface of the plating layer is less than a surface roughness of an inner peripheral surface of the plating layer, the outer peripheral surface of the plating base layer is roughened to have a surface roughness of 2 μm or more, and the arithmetic mean roughness Ra of the inner peripheral surface of the plating layer is 2 μm or more and the arithmetic mean roughness Ra of the outer peripheral surface of the plating layer is less than 2 μm, and wherein the insulator comprises a fluoropolymer and the plating base layer comprises polyethylene or polypropylene.

* * * * *